July 10, 1956 S. W. McKENDREE 2,753,590
PINFEATHER PICKER
Filed Dec. 21, 1954
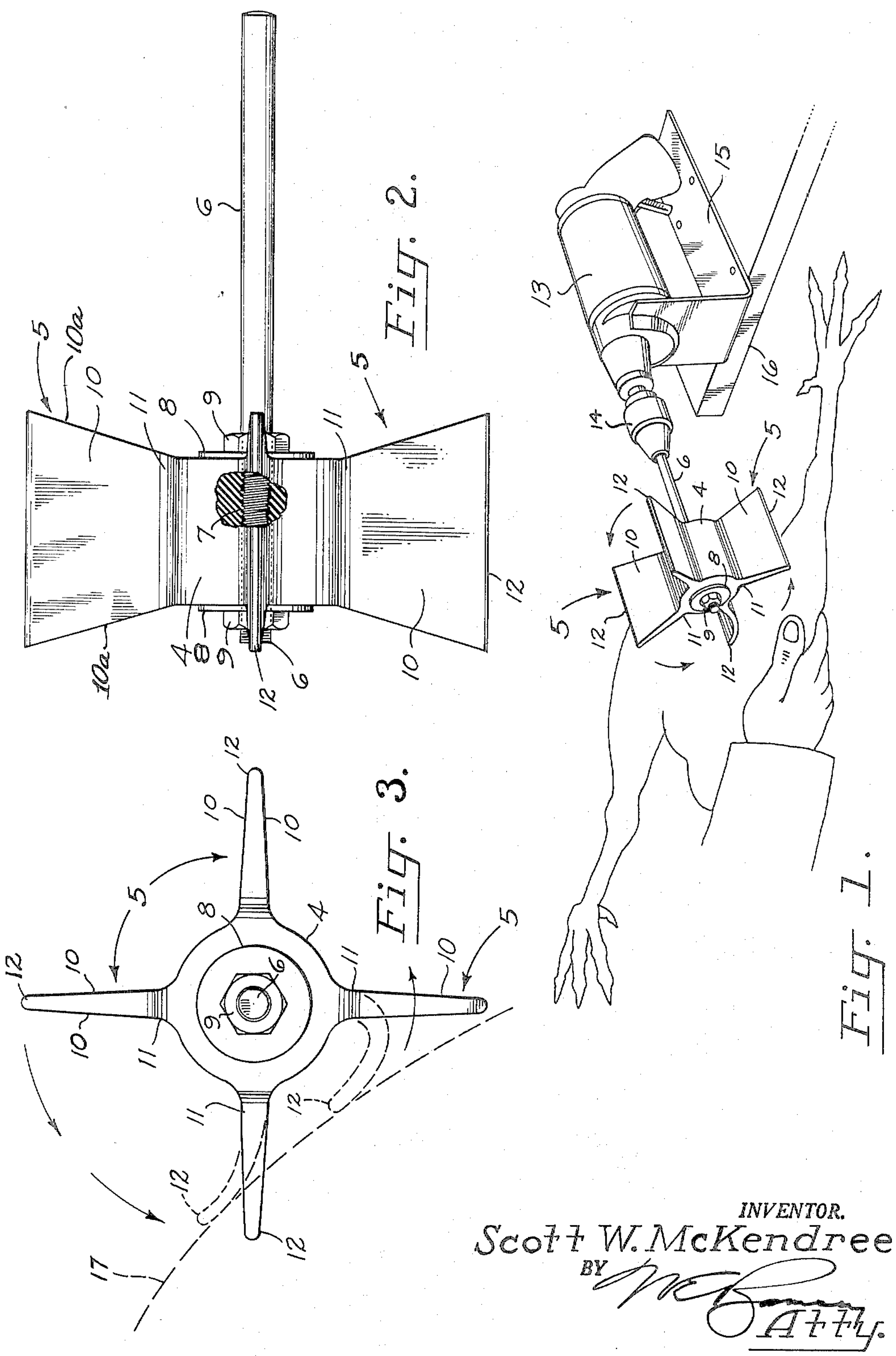

United States Patent Office 2,753,590

Patented July 10, 1956

1

2,753,590

PINFEATHER PICKER

Scott W. McKendree, Klamath Falls, Oreg., assignor to McKendree Products Co., Klamath Falls, Oreg., a corporation of Oregon Application December 21, 1954, Serial No. 476,698

4 Claims. (Cl. 17—11.1)

This invention relates to a feather picker useful commercially or by a householder to remove the pinfeathers from scalded fowl such as chickens.

One object of my invention is to provide an inexpensive yet an efficient portable picking head adapted for attachment to a separate source of rotary power such as the chuck of a portable electric drill in order to remove feathers mechanically with a structure of minimal expense.

A further object of my invention is to provide a feather picking mechanism which is useful during the final step of an assembly line picking operation in a commercial poultry dressing establishment to remove the pinfeathers and hair from a semi-plucked chicken and which, at the same time, is useful to a householder or other occasional poultry dresser to remove all of the feathers, both large and small, during a normal plucking operation.

The present state of the poultry plucking art reveals a void. Thus, there are at present upon the market a great variety of automatic feather picking machines. Substantially all of these, however, are massive commercial models adapted to dress a large number of chickens in a short period of time. Because of their intended function, they are complex, expensive machines capable of high speed operation upon a number of chickens at the same time. They do not, however, serve the purpose of the small chicken farmer, the restaurant specializing in chicken dinners, the individual householder and other occasional dressers of poultry who cannot afford to purchase a complex, commercial machine and thus are required to practice hand plucking. In view of this state of void in the chicken picking art, it is one object of my invention to provide a small, inexpensive and portable picker for use in dressing small numbers of chickens.

A related inventive objective is the provision of a portable feather picker head which is adapted for attachment to any of various common sources of rotary power so the cost of the picker itself can be kept to a minimum in order that the average householder or other occasional poultry dresser can afford to purchase a picker and thus be relieved of the tedious chore of hand picking.

In the commercial dressing of chickens, the fowl first are scalded and then are fed on assembly line conveyors to a commercial feather picking machine. At the machine, multiple flexible arms or fingers rotate at a high rate of speed and flay the bird to pull, scrape and remove a majority of the large feathers. Thereinafter, it is common practice to move the chickens by conveyor to a second work station. Here skilled laborers, usually women, hand pick the pinfeathers and remaining small feathers to complete the commercial dressing. Conventionally, pinfeathers are removed by these women with special tweezers or pliers or with a bladed instrument such as a paring knife and the thumb. In any event, the final step in a commercial dressing operation is a pure labor item with the workers employed on a piece work basis today averaging between ten and fifteen cents per chicken and fifteen and twenty cents per turkey. To the best of my knowledge, no efficient mechanical device has been adopted by or made available to these workers in the removal of hair and small feathers such as pinfeathers.

2

In service to this special sector of the poultry dressing industry, it is one object of my invention to provide a mechanical picker particularly adapted to remove the pinfeathers and other small feathers from a semiclean fowl from which the larger feathers previously have been removed.

The most tenacious and difficult feathers to remove on a chicken are the pinfeathers. In structure, they are elongated annular tubes having a hollow bore filled with a viscous material. The ends of these feathers are closed over and sealed somewhat like capsules in order to retain the viscous material within the hollow bore. In devising a mechanical structure particularly adapted to remove pinfeathers, I have found that removal of the viscous material from the hollow bore prior to plucking makes the pinfeather more easy to remove from the skin of the fowl. Thus, after considerable experimentation, I have settled upon a flat smooth paddle construction which is formed of flexible material. This paddle is rotated against the skin of the chicken so as to wipe longitudinally of the pinfeathers from the skin toward the tip. The first thing that happens is that the capsule-like structure is broken and the viscous material within the hollow bore is exuded. This allows the capsule to be collapsed when additional wiping pressure is applied thereto and the outward pressure of the capsule upon the skin of the fowl then is relaxed sufficiently to allow the pinfeather easily to be removed by still further wiping action. Sequentially, then, it is an object of my invention to provide a pinfeather picker which will apply repeated wiping, flay and friction like strokes longitudinally of a pinfeather first to break the capsule and release the viscous material and then to pull the empty feather capsule from the skin by continued wiping pressure.

As a further advantage of my invention, I have determined that the controlled application of a wiping action with a smooth flexible paddle can be regulated as to pressure in order to effect the collapse and release of a pinfeather without breaking the skin of the fowl. The paddle structure allowing the above functions thus defines the scope of one portion of my invention.

To the above ends, my portable picker includes a rotatable cylindrical hub member having plural integral paddles with broad flat faces extending radially thereof. The hub and paddles preferably are formed as an integral rubber molding with each paddle being fan shaped in a direction radially of the hub. The paddle faces are plane and smooth yet frictional so as to flex and conform to the contours of the skin of a fowl and thus scrape or pull over a wide swath upon the small pinfeathers. In addition, the sides which bound the faces of each paddle are divergent in a direction proceeding from the base toward the tip of each paddle. At the same time, the flat faces themselves are convergent to provide a tapered paddle body more thick and less flexible adjacent the base than adjacent the tip. By holding the body of a fowl lightly against the rapidly revolving paddles, a greater striking force and a smaller pulling force is exerted. Conversely, when the body of the fowl is pushed toward the axis of rotation of the paddles, more of a pulling force and less of a striking force is exerted. This allows the person using my feather picker to develop a feel which experience will allow him to correlate to the type of feather being plucked. With small difficult pinfeathers, a great deal of pressure is applied and with larger more massive feathers, less pressure is applied. The structure above described also is within the scope of my invention and the provision thereof is one inventive object.

Yet another object of my invention is to provide a pinfeather picker in which both the periphery of the hub and the faces of the paddles are smooth and even surfaced and in which the tips of each paddle are rounded in order to prevent damage to the skin of a fowl while, at the same time, providing a structure which efficiently will remove all feathers of whatever size from a chicken.

Still another object of my invention is to provide a portable pinfeather picker which is of light weight and is compact due to the fact that it is powered by a portable electric drill, or the like, in order that the picker itself can be sold at a minimum price and shipped for a minimum tariff fee. These provisions are of substantial benefit practically since my picker thus can be sold and shipped in large quantities throughout the United States in direct contrast with the expensive, complex commercial machines now upon the market.

These and other objects and advantages of my invention will become apparent during consideration of the following detailed description, taken in conjunction with the accompanying drawings, wherein:

Fig. 1 is a perspective view of a work bench with a fixed mount carrying a portable electric drill in the chuck of which is secured the shaft of one of my rotary feather pickers, the direction of rotation during use upon a chicken being indicated by arrows;

Fig. 2 is a side view of the cylindrical hub member, shaft, and paddles as they appear while not in use; and Fig. 3 is an end view of the structure in Fig. 2 with dashed outlines added to indicate the flexing and the wiping action of the paddle members while pinfeathers are being removed from a fowl, the direction of rotation being indicated by arrows in this figure also.

The main structural element of the picker is an elongated cylindrical hub member 4 having a plurality of flat faced flexible paddles 5 (four of these are shown) extending radially out from the periphery thereof. The hub 4 and paddles 5 preferably are formed as an integral rubber molding which is symmetrical about the axis of the hub, as is indicated in Fig. 3. The hub itself is formed with an axial aperture or tunnel adapted to receive a drive shaft 6. In molding the hub, the aperture or tunnel purposely is formed undersize in relation to the shaft 6. Additionally, sharp edged standard screw threads 7 are formed on the shaft over the length thereof which occupies the tunnel.

In assembling the shaft and hub so as to provide a tight, force fit, a pair of round washers 8 and a pair of nuts 9 are employed. Presuming an exemplary drive shaft 6 is standard quarter inch stock, the aperture in the hub 4 will be made slightly undersize, as for example three-sixteenths inch in diameter. Initially, the right hand one of the nuts 9 and washers 8 is assembled upon the shaft and the screw threads 7 are engaged with the aperture in the hub. Considerable pressure and force are required to push and thread the shaft 6 into the aperture to the point where the end thereof protrudes from the opposite face. Finally, the left hand washer 8 and nut 9 are assembled and cinched tight so the entire mechanism rotates as a unit. This particular construction also is of benefit in maintaining a dynamic balance when the hub, shaft and paddles are rotated at high speed and thus provides a long lived structure and one which will resist the wear and hard usage imposed during the picking of feathers.

Reference now will be had to the details of construction and to the particular structure of each paddle whereby pinfeathers can be removed with speed and efficiency. The paddles 5 each are fan shaped in a direction radially of the hub and are bounded by sides 10*a*, broad flat faces 10, a base 11, and a tip 12. I prefer to form each paddle so the radial length thereof is less than the diameter of the hub 4. Referring to Fig. 2, the straight sides which bound the paddle faces 10 are divergent at equal but opposite oblique angles to the radial line of the hub proceeding in a direction from the base 11 to the tip 12. This fan-shaped configuration provides a wider swath adjacent the tip than adjacent the base. At the same time, Fig. 3 reveals that the flat, plane faces 10 are convergent in a direction from the base toward the tip thereby bounding a tapered paddle body which is more thick and less flexible adjacent the base 11 than adjacent the tip 12. The variance in width and thickness of each paddle is of importance in providing a structure which is efficient in the removal of pinfeathers. Thus, the flexibility of each paddle will vary from tip to base providing a structure with which varying degrees of force can be generated merely by moving the fowl in toward the base of the paddles or by moving it out toward the tip of the paddles, all as hereinafter will be described.

As a further structural element of the paddles, each tip 12 is rounded in a radial direction to prevent damage to the skin of the fowl. At the same time, each tip will be seen to be straight and parallel the axis of the cylindrical hub 4 so as to provide an even contact covering a maximum possible area. In cooperation with these provisions, the faces 10 are plane and smooth while retaining a frictional construction due to the rubber material of which the hub and paddles are formed. This plane, smooth construction allows the paddle to flex about and to conform to the contour of the skin and body of the fowl and thus more efficiently to wipe, scrape and pull upon a large area of the small pinfeathers. With large commercial plucking machines and with apparatus concerned primarily with removing all types of feathers, it heretofore has been considered essential that the paddles be roughened, serrated, irregular or provided with projections and knobs. However, while these irregularities may help remove the larger feathers, I have found they actually decrease their efficiency in removing small pinfeathers. For example, a uniform wiping action is not generated, the limited area of contact may actually miss some pin feathers altogether, and an uneven pressure is applied. It is for this reason, that both the periphery of the hub and the faces of my pin feather paddles are smooth and even surfaced. They thus conform to the skin of a plucked fowl upon which the small pinfeathers remain and more efficiently cover a wide area of the skin with a controlled wiping action.

In using my feather picker, any source of rotary power to which the shaft 6 will connect may be employed. I prefer to use a portable electric drill or the like 13 having a chuck 14. This drill is secured tightly, by means of a fixed mounting 15, to a bench, table or other horizontal surface 16. The shaft 6 is fitted to the chuck 14 so the hub and paddles extend out from the bench 16 as shown in Fig. 1. As is indicated by the direction arrows in the same figure, the direction of rotation of the hub should be counterclockwise, as viewed from the free end of the shaft, when the worker stands to the left.

As a preliminary step to either a commercial or an occasional plucking operation, the chicken or other fowl is immersed in water which is at least 132 degrees Fahrenheit in temperature. The fowl is left in this water a sufficient length of time for the feathers to loosen properly, the average time being thirty to fifty seconds. Presuming that the picker is used by a householder, small chicken farmer, or other occasional user, all of the feathers must be removed. To this end, the worker stands with the picker directly in front of him and with the drill to his left. The chicken is grasped with the right hand supporting the body from beneath and is brought up under the picker and into contact with the rotating paddles, in order to remove a majority of the large feathers. During this so-called "rough picking," it does not seem to make any difference whether the feathers are plucked with or against their direction of growth. In either event, the fast rotating paddles flay, wipe and pull the feathers from the skin of the fowl much more rapidly than the corresponding hand picking. It sometimes is necessary to pull the large wing feathers and/or a few of the tail feathers by hand but this contingency will depend upon the individual fowl and the experience of the worker employing my invention.

In finish picking a fowl or in using my picker to replace the final step in a commercial poultry dressing house, all large feathers have been removed and only the small pinfeathers remain. To begin with, the chicken should be substantially but not completely dry so that the skin feels somewhat tacky to the touch. It then is necessary to pick with the direction of growth of the pinfeathers and not against them. Furthermore, should the fowl become dry during the finish picking, it may be necessary to moisten or dampen the skin somewhat. In either event, the bird is grasped as before from beneath and is brought up against the rapidly rotating paddles except that a substantially greater amount of pressure must be used with pinfeathers than with the other larger feathers. This increased pressure is applied by moving the fowl radially in toward the axis of rotation so the paddles will flex closer to their bases. With experience, the worker will gain a feel which allows him to judge the pressure and to apply sufficient force to remove the pinfeathers without damage to the skin. Were the paddles not smooth, less pressure could be applied without breaking the skin and I thus deem the paddle construction to be of primary importance.

I have found that with chicken pinfeathers, manipulation of the fowl will cause the paddles to take the deformed shape shown in dashed outline in Fig. 3. In that figure, the numeral 17 represents the skin or body of a fowl which has been picked clean except for the pinfeathers. As pressure is exerted to move the fowl radially toward the axis of the rotating hub 4, the flexible paddles 5 yield and give, as is shown. In addition, they yield across the width of each paddle to conform to the contours of the body of the chicken. The first time or two that a pinfeather is contacted with the smooth surface of a paddle, the feather is not removed but instead merely is broken open and collapsed causing the viscous material which fills the bore of the feather to be exuded. Thereinafter, the outward pressure of the pinfeather against the skin is relaxed due to the release of the viscous material and the empty capsule easily may be pulled from the skin by the continued wiping pressure of additional contacts of the smooth paddle faces. In actual practice, of course, the body of the fowl can be moved quite rapidly back and forth under the rotating paddles and an entire dressing operation will consume no more than six minutes. A mere finishing operation to remove pinfeathers alone, on the other hand, can be accomplished in from two to three minutes and this allows a mechanized operation to replace the purely manual operation heretofore practiced in commercial poultry dressing houses.

In summary, I have provided a feather picker which can be used by the average householder, small chicken farmer or other occasional poultry dresser completely to pluck a bird in a short period of time with an inexpensive mechanism adapted to fit a portable electric drill or the like. At the same time, my feather picker can be used in commercial establishments to accomplish the final step of removing the pinfeathers after an automatic machine has done the rough picking. In either event, it is the particular configuration, arrangement and construction of the plane smooth paddle faces which are tapered, divergent, rounded at the tip and flexible which permits the use of a varying force to remove the pinfeathers with speed and efficiency. Still further, the simplicity of the construction and the minimal number of parts incorporated therein permits my picker to be sold at a minimum cost and to be shipped for a minimum tariff charge. This makes my device available pricewise to the vast market heretofore employing manual methods to pluck chickens and the like.

I claim:

1. A portable pinfeather picker, comprising an elongated cylindrical hub member adapted for rotation about the axis of the cylindrical shape, a plurality of elongated flat faced flexible paddles extending radially out from the periphery of said hub member a distance less than the diameter of the cylindrical hub, said hub and paddles all being of a flexible rubber construction defining a body which is symmetrical about the axis of the hub and toward which the paddles may flex under pressure, said paddle faces being plane and smooth so as to conform to and lie against the skin of a fowl and thus to pull and scrape small pinfeathers, said paddle faces having bounding side walls which are straight and divergent at equal but opposite oblique angles to a radial line of the hub in a direction from the base to the tip of each paddle in order to cover a wider swath with the tips than with the bases.

2. The structure set out in claim 1 modified in that said cylindrical hub member is provided with a threaded shaft extending axially thereof, said shaft constituting a mounting having a force fit within said hub.

3. An article of manufacture, comprising an elongated cylindrical hub member secured axially with a force fit to a rotatable shaft adapted for attachment to the chuck of a portable electric drill or the like, four elongated flexible paddles extending radially out from the periphery of said hub member a distance less than the diameter of the cylindrical hub, said hub and paddles all being an integral rubber molding symmetrical about the axis of the hub to permit the paddles to flex under pressure, each of said paddles having bounding side walls and being fan shaped in a direction radially of said hub with broad flat faces and with a base equal in length to the length of the cylindrical hub, the side walls bounding said paddle faces being straight and divergent at equal but opposite oblique angles to a radial line of the hub in a direction from the base to the tip of each paddle in order to cover a wider swath with the tips than with the bases, and the flat faces of each paddle being convergent in a direction from the base to the tip thereby bounding a tapered paddle body more thick and less flexible adjacent the base than adjacent the tip.

4. A pinfeather picker, comprising a fixed mounting means operatively carrying an elongated cylindrical hub member secured axially with a force fit to a shaft adapted for attachment to the chuck of a portable electric drill or the like and adapted for rotation about the axis of said cylindrical shape, four elongated flat faced flexible paddles extending radially out from the periphery of said hub member, said hub and paddles all being an integral rubber molding symmetrical about the axis of the hub to permit the paddles to flex under pressure, each of said paddles having bounding side walls and being fan shaped in a direction radially of said hub with a base equal in length to the length of the cylindrical hub, said paddle faces being plane and smooth yet frictional so as to conform to and lie against the skin of a fowl and thus to pull and scrape small pin-feathers, the side walls bounding said paddle faces being straight and divergent in a direction from the base to the tip of each paddle, the flat faces of each paddle being convergent in a direction from the base to the tip thereby bounding a tapered paddle body more thick and less flexible adjacent the base than adjacent the tip, the tip of each paddle being straight and parallel the axis of said cylindrical hub but being rounded in a radial direction to prevent damage to the skin of a fowl.

References Cited in the file of this patent

UNITED STATES PATENTS

| | | |
|---|---|---|
| 1,654,275 | Strand | Dec. 27, 1927 |
| 2,334,690 | Yden | Nov. 23, 1943 |
| 2,412,108 | Toti et al. | Dec. 3, 1946 |
| 2,714,222 | McKendree | Aug. 2, 1955 |